United States Patent
Lomerson, Jr. et al.

(10) Patent No.: US 6,854,591 B1
(45) Date of Patent: Feb. 15, 2005

(54) DETACHABLE FLIGHT FOR POCKET SIZE ADJUSTMENT

(75) Inventors: Roland Lomerson, Jr., Bradenton, FL (US); Geoffrey James Parnell, Midlothian, VA (US); James Prill, Richmond, VA (US)

(73) Assignee: Bakery Holdings LLC, Richmond, VA (US)

( * ) Notice: Subject to any disclaimer, the term of this patent is extended or adjusted under 35 U.S.C. 154(b) by 29 days.

(21) Appl. No.: 10/748,957

(22) Filed: Dec. 30, 2003

(51) Int. Cl.$^7$ ............................................... B65G 19/24
(52) U.S. Cl. ........................................ 198/731; 198/730
(58) Field of Search ................................. 198/728, 730, 198/731, 817

(56) References Cited

U.S. PATENT DOCUMENTS

| | | | |
|---|---|---|---|
| 3,961,702 A | * 6/1976 | Blok | 198/731 |
| 5,088,594 A | * 2/1992 | Edmondson | 198/731 |
| 5,911,303 A | * 6/1999 | Malanowski | 198/731 |
| 6,367,612 B1 | * 4/2002 | Dosso et al. | 198/728 |
| 6,571,936 B1 | * 6/2003 | Melhuish et al. | 198/731 |

* cited by examiner

Primary Examiner—James R. Bidwell

(57) ABSTRACT

In collating packaging equipment and the like, a novel flight that comprises a flight body including at least one spring loaded arm that engages the conveyor drive chain to allow rapid and simplified interchangeability of flight arrangements, i.e. pitch or pocket size, without the need for disassembly and re-assembly of the entire flight drive mechanism.

16 Claims, 4 Drawing Sheets

DETACHABLE FLIGHT FOR POCKET SIZE ADJUSTMENT

FIELD OF THE INVENTION

The present invention relates to packaging and similar equipment and more particularly to an interchangeable flight that allows quick adjustment of the pocket size in, for example, a collating transport system.

BACKGROUND OF THE INVENTION

Collating packaging system often comprise a pair of moving chain drives having flights therebetween. The pockets, pocket size or "pitch" of the system are defined by flights that are conventionally welded or bolted to the chains on opposing sides of the drive system. In conventional such systems, changing the pocket size or pitch is a rather significant undertaking as it requires changing the entire chain drive system to which the flights are attached. This is typically accomplished by the removal of the currently installed chains and flights and installation of a new chain pair containing flights attached at intervals that define the desired new pocket size. Such changeover from one pocket size is tedious, time consuming and labor intensive and consequently expensive.

It would therefore be highly desirable to have a collating system that included flights that were easily changed without the need to remove the entire chain drive system to accomplish the installation of pockets of a different size or the need for tools.

OBJECT OF THE INVENTION

It is therefore an object of the present invention to provide a collating packaging system that allows for rapid and easy changeover of pocket size without the need to replace the entire chain drive system.

It is another object of the present invention to provide an improved flight structure for installation on conventional drive chains that allows for quick and easy changes in pocket size on collating equipment of the type referred to herein.

SUMMARY OF THE INVENTION

According to the present invention there is provided a novel flight that comprises a flight body including at least one spring loaded arm that engages the conveyor drive chain to allow rapid and simplified interchangeability of flight arrangements without the need for disassembly.

DETAILED DESCRIPTION

As described in the Background of the Invention, in, for example, the packaging industry, many unit handling conveyors (collating conveyors) comprise a pair of parallel drive chains having attached thereto between the drive chains flights that define the pitch or pocket size between flights. The changing of flights to accommodate different pocket sizes depending upon the size and shape of the units of material being handled in the equipment is a relatively long and complicated effort due to the flights being welded or otherwise attached to the drive chains in such a way that removing the flight is cumbersome. The changeover from one pocket size to another involves the removal of one drive chain pair and its replacement with an entirely different drive chain pair that incorporates flights spaced at the proper interval to accommodate the product being handled within the individual pockets. The novel flight apparatus of the present invention simplifies this changeover process significantly.

Figure 1:
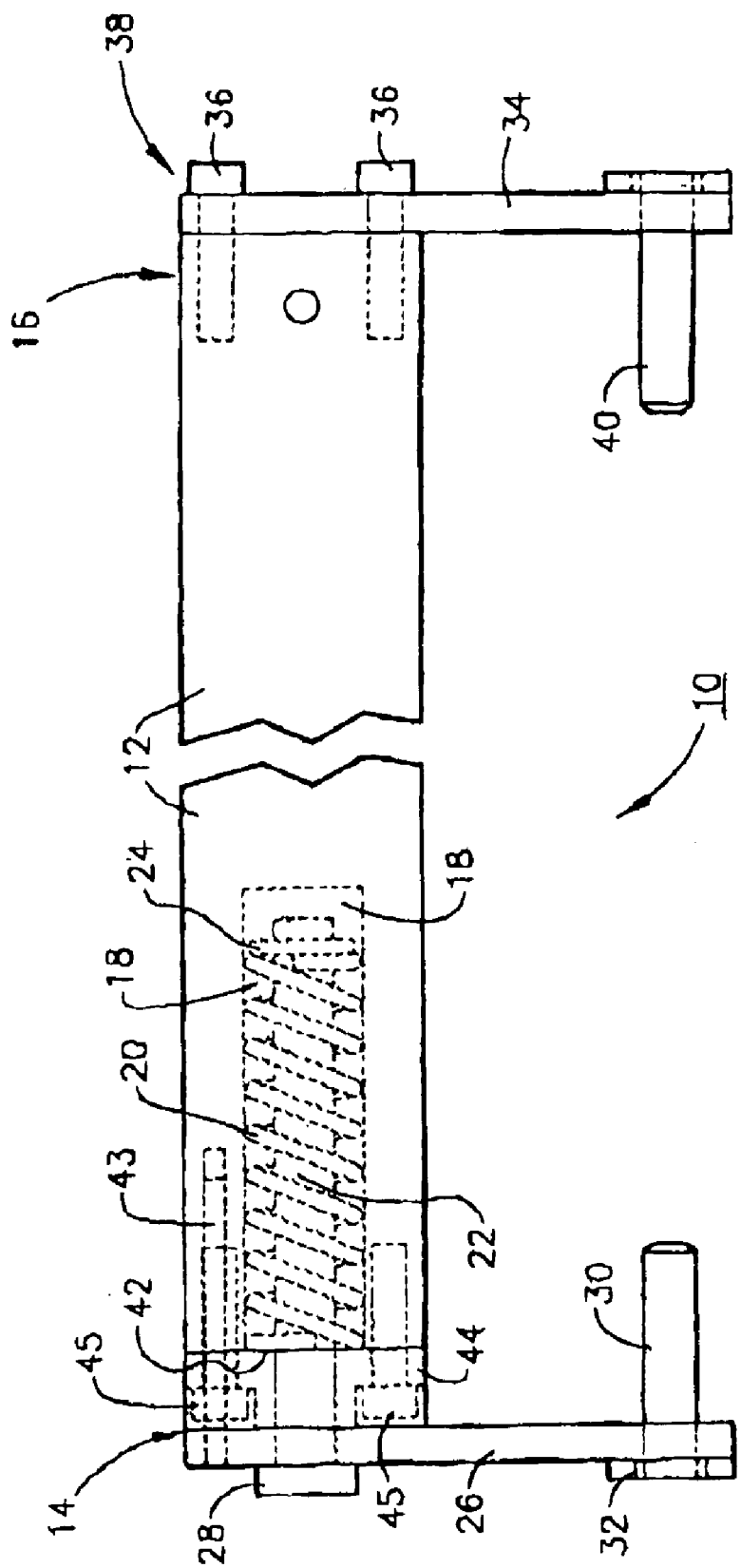
FIG. 1 is a partially phantom side view of the flight of the present invention.

Referring now to FIG. 1, the improved and simplified material handling apparatus of the present invention relies upon the use of a novel flight 10 to accomplish the improvements described herein. As depicted in FIG. 1, flight 10 of the present invention comprises a flight body 12 having extremities 14 and 16. Within at least one of said extremities 14 or 16 is a chamber 18 within which is located a spring 20 mounted about a shaft 22 and retained about shaft 22 by retainer (such as a washer) 24. Shaft 22 is fixed to arm 26 through any suitable fastening means such as bolt 28. At the end of arm 26 opposing that attached to shaft 22 is a chain engagement pin 30 also suitably fastened to arm 26, as, for example, with a head 32. In the embodiment of the present invention depicted in FIG. 1 at opposing end 16 of flight 10 is a second arm 34 suitably fastened to flight body 12, for example using bolts 36, at its first extremity 38 proximate flight body 12 and includes a second chain engagement pin 40 similar, if not identical, to chain engagement pin 30 fastened to arm 34 similarly to engagement pin 30's engagement with arm 26. Spring 20 is retained within chamber 18 through its engagement with wall 42 that is formed by end plate 44 that is retained by bolts 45 in extremity 14 of flight body 12. According to the embodiment depicted in FIG. 1, a guide shaft 43 is provided to assure proper alignment of chain engagement pin 30 with aperture 48B in chain link 46B shown in greater detail in FIGS. 2 and 3. Guide shaft 43 also prevents any rotation of arm 26 about extremity 14 of flight body 12.

Figure 4:
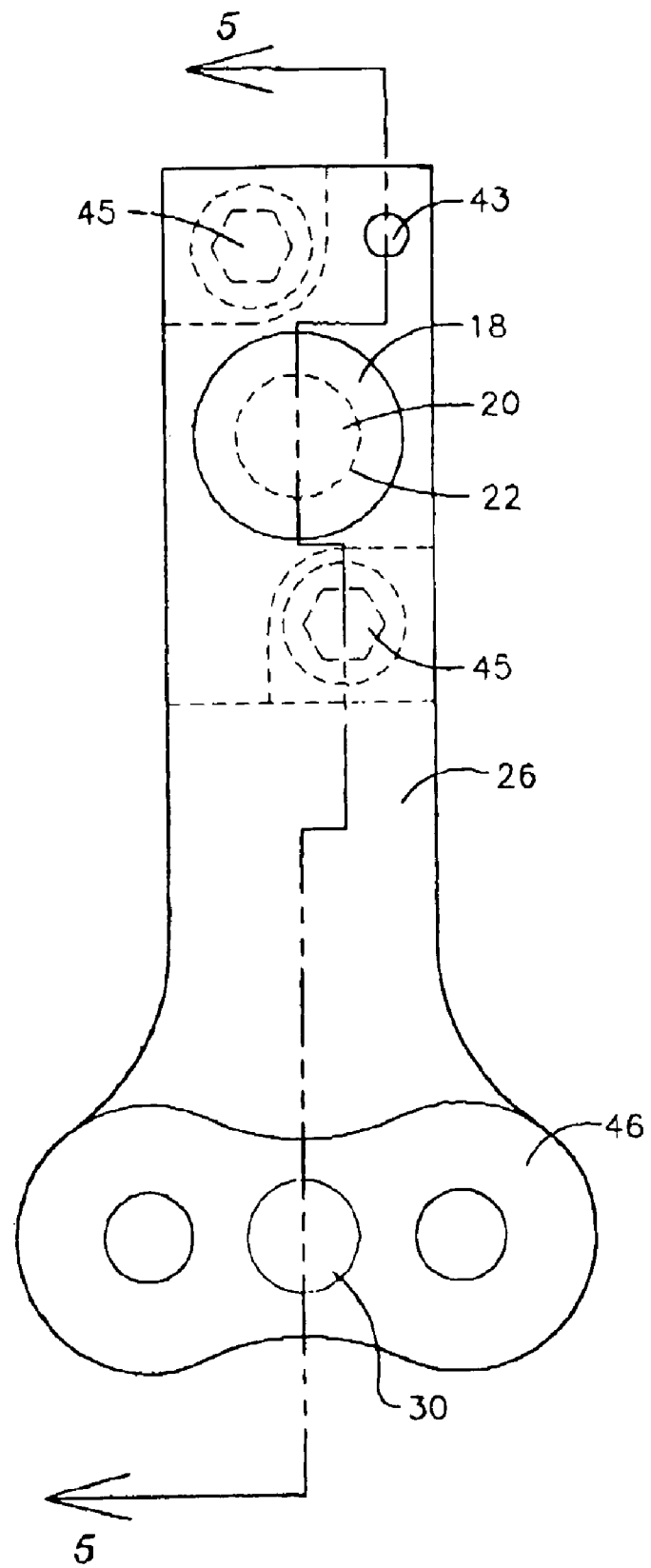
FIG. 4 is a partially phantom end view of the flight of the present invention engaged with one of a pair of drive chains.
Figure 5:
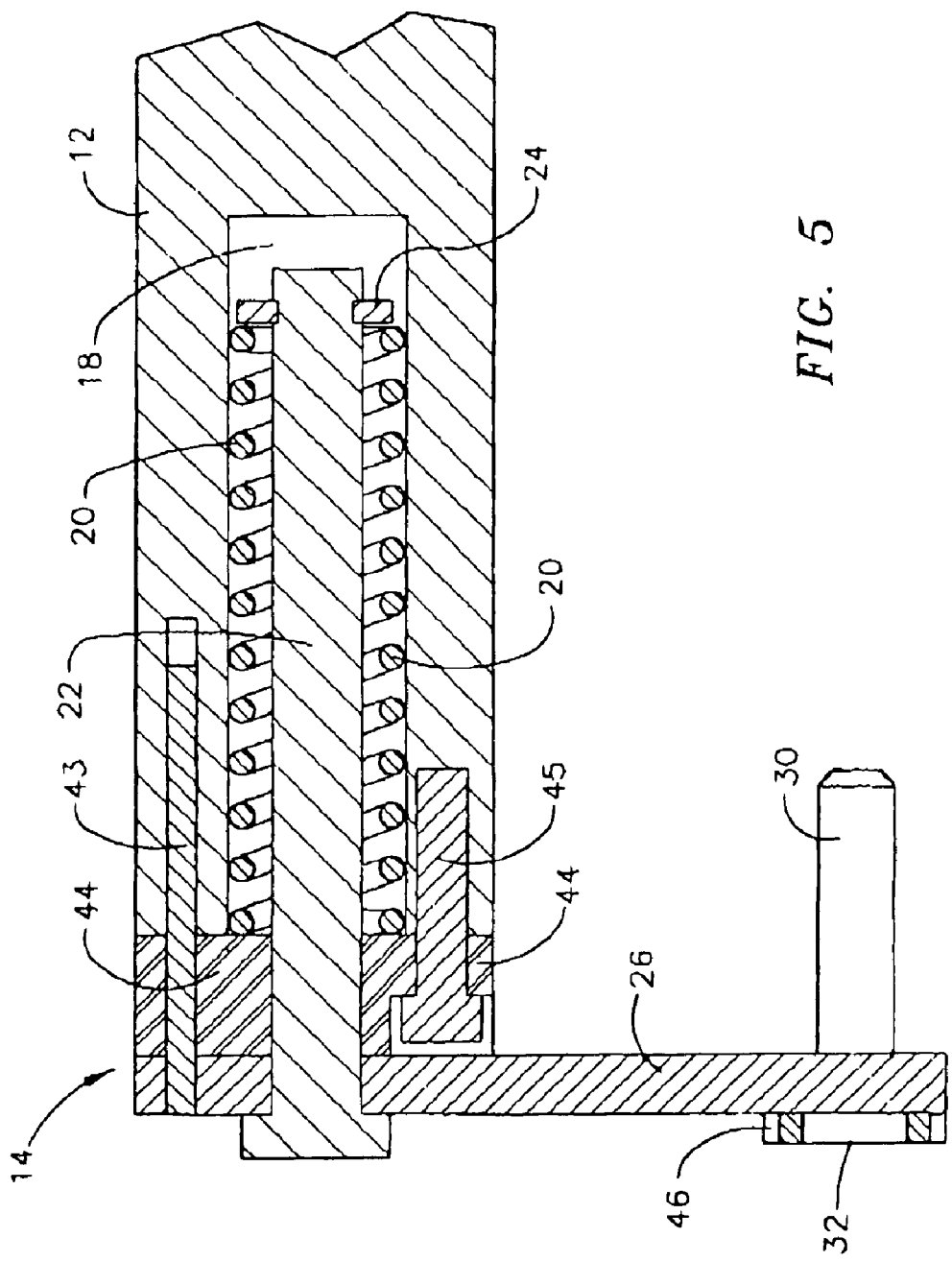
FIG. 5 is a cross-sectional view of the flight of the present invention along the line 5—5 of FIG. 4.

FIG. 5 depicts a cross-sectional view of extremity 14 of flight body 12 and provides a more detailed view of chamber 18, spring 20, end plate 44, arm 26 and chain engagement pin 30, while FIG. 4 shows more clearly, through a partially phantom end view, the engagement of drive chain pin 30 with a drive chain link 46.

Figures 2, 3:
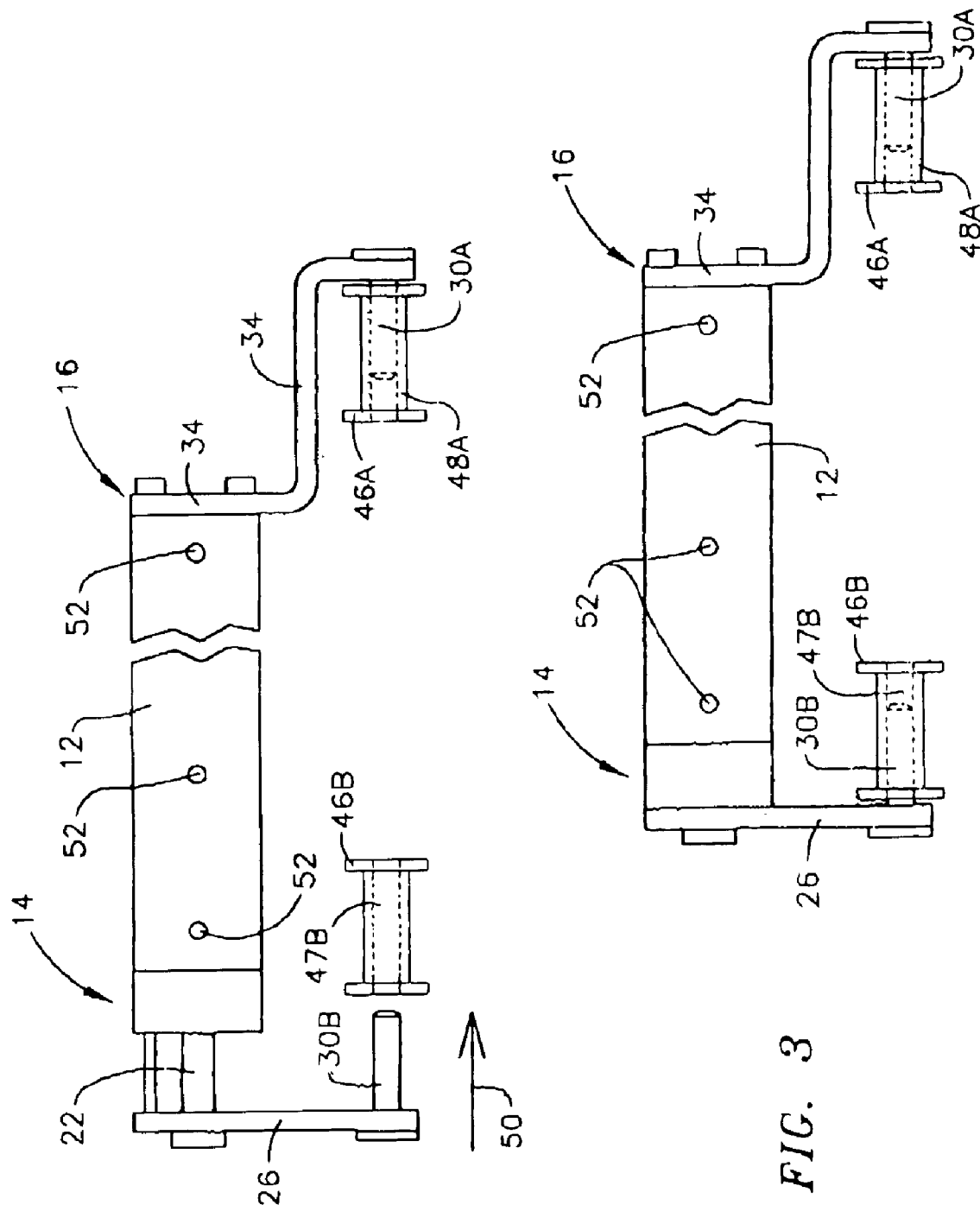
FIG. 2 is an side view showing the method of engagement of the flight of the present invention with the links in a pair of drive chains.
FIG. 3 is a side view showing the flight of the present invention engaged with the links of a pair of drive chains.

Referring now specifically to FIGS. 2 and 3, the mechanism for engagement/disengagement of flight 10 with drive chain links 46A and 46B is shown most clearly. As shown in FIG. 2, to engage flight 10 with drive chain links 46A and 46B, chain engagement pin 30A is inserted into an aperture 48A in drive chain link 46A. Arm 26 is then pulled to the left in FIG. 2 against the restraining force supplied by spring 20 previously described. This action moves arm 26 and attached chain link pin 30B outward and away from flight body 12. As will be obvious to the skilled artisan, during the assembly/disassembly operation drive chain links 46A and 46B remaining installed on the conveyor equipment remain at a fixed distance apart. Chain drive pin 30B is then aligned with aperture 48B in drive chain link 46B and allowed to enter aperture 48B through the action of spring 20 pulling arm 26 and drive chain pin 30B in the direction shown by arrow 50. As shown in FIG. 3, in the fully engaged position, chain drive pin 30B has entered aperture 48B and flight body 12 is firmly attached to drive chain links 46A and 46B through this engagement of the operative parts.

While flight 10 has been depicted and described as having a single spring 20 assembly for drawing chain drive pin 30B into drive chain link 46B, it will be readily apparent to the skilled artisan that flight 10 could readily be equipped with a pair of oppositely facing springs 20, one of which causes chain drive pin 30B to enter chain drive link 46B while the second causes chain drive pin 30A to enter an oppositely located chain link 46A. In such a modification, arm 34 could be angled as depicted in, for example, FIG. 2 or straighter as arm 26 is depicted in this same Figure.

Flight 12 also preferably incorporates apertures 52 for the attachment of appropriate profiles, i.e. extensions, for the handling of, for example, oversized (too tall) units within pockets between chain links 46A and 46B and an adjacent pair of flights 12.

There has thus been described a novel flight that allows for the rapid and simplified changing of pitch or pocket size without the need for the complete disassembly and re-assembly of the flight drive chain/flight mechanism. Such a novel flight provides for the simplified and expeditious rearrangement of flights within a conveyor system to accommodate the handling of units of differing size in pockets appropriate to the unit being handled.

As will be apparent to the skilled artisan, a number of variations and modifications can be made to the structure described above without departing from the spirit and scope of the present invention. All such modifications and variations are clearly contemplated as being within the scope of the appended claims.

What is claimed is:

1. A flight for use in collating packaging equipment and the like comprising:
    A) a flight body having first and second extremities;
    B) a spring mounted in at least one of said extremities;
    C) a first arm attached to said spring and extending from said flight body;
    D) a first chain drive engagement pin attached to said first arm and extending in the direction of said flight body;
    E) a second arm extending from the other of said extremities; and
    F) a second chain drive engagement pin attached to said second arm;
said first arm and said spring connected such that when said first arm is drawn away from said first or second extremity said spring acts to draw said first arm and said attached first chain drive engagement pin and said second arm and said second chain drive engagement pin back toward said flight body.

2. The flight of claim 1 comprising a single spring mounted in one extremity of said flight body.

3. The flight body of claim 1 comprising a pair of opposed spring and arm assemblies located at opposing extremities of said flight body.

4. The flight of claim 1 wherein said flight body includes at least one chamber in one of said extremities and said spring is mounted in said chamber.

5. The flight of claim 1 further including a guide shaft attached to said first arm for maintaining the proper orientation of said first arm and said chain drive engagement pin.

6. In combination a flight and drive chain comprising:
    A) a flight body having first and second extremities;
    B) a spring mounted in at least one of said extremities;
    C) a first arm attached to said spring and extending from said flight body;
    D) a first chain drive engagement pin attached to said arm and extending in the direction of said flight body;
    E) a second arm extending from the other of said extremities;
    F) a second chain drive engagement pin attached to said second arm;
    and
    G) a pair of parallel drive chains having connected but spaced apart links that include a central aperture of a size to receive said chain drive engagement pin;
said first arm and said spring connected such that when said first arm is drawn away from said first extremity said spring acts to draw said first arm and said attached chain drive engagement pin and said second chain drive engagement pin back toward said flight body and into pre-selected of said apertures thereby causing engagement of said flight body with links in each of said drive chain pair.

7. The flight of claim 1 comprising a single spring mounted in one extremity of said flight body.

8. The flight body of claim 1 comprising a pair of opposed spring and arm assemblies located at opposing extremities of said flight body.

9. The flight of claim 1 wherein said flight body includes at least one chamber in one of said extremities and said spring is mounted in said chamber.

10. The flight of claim 1 further including a guide shaft attached to said first arm for maintaining the proper orientation of said first arm and said chain drive engagement pin.

11. A flight for use in collating packaging equipment and the like comprising:
    A) a flight body having first and second extremities;
    B) a spring assembly in at least one of said extremities;
    C) a first chain drive engagement pin attached to said spring assembly;
    D) a second chain drive engagement pin attached to said second extremity;
said spring assembly and said first chain drive engagement pin connected such that when said first chain engagement pin is drawn away from said first extremity said spring acts to draw first chain drive engagement pin back toward said flight body.

12. The flight of claim 10 wherein said spring assembly comprises an arm having first and second extremities attached to said spring at one of said extremities and said chain drive engagement pin is attached to the other of said extremities.

13. The flight of claim 11 wherein said spring is located in a chamber in said flight body extremity.

14. The flight of claim 12 wherein said spring is a coil spring and further including a shaft about which said coil spring is oriented.

15. The flight of claim 13 further including a guide shaft in said flight body extremity, said guide shaft being attached to said arm to prevent rotation of said arm about said shaft.

16. The flight of claim 10 comprising a pair of opposed spring assemblies located at opposing extremities of said flight body.

* * * * *